Patented Mar. 17, 1942

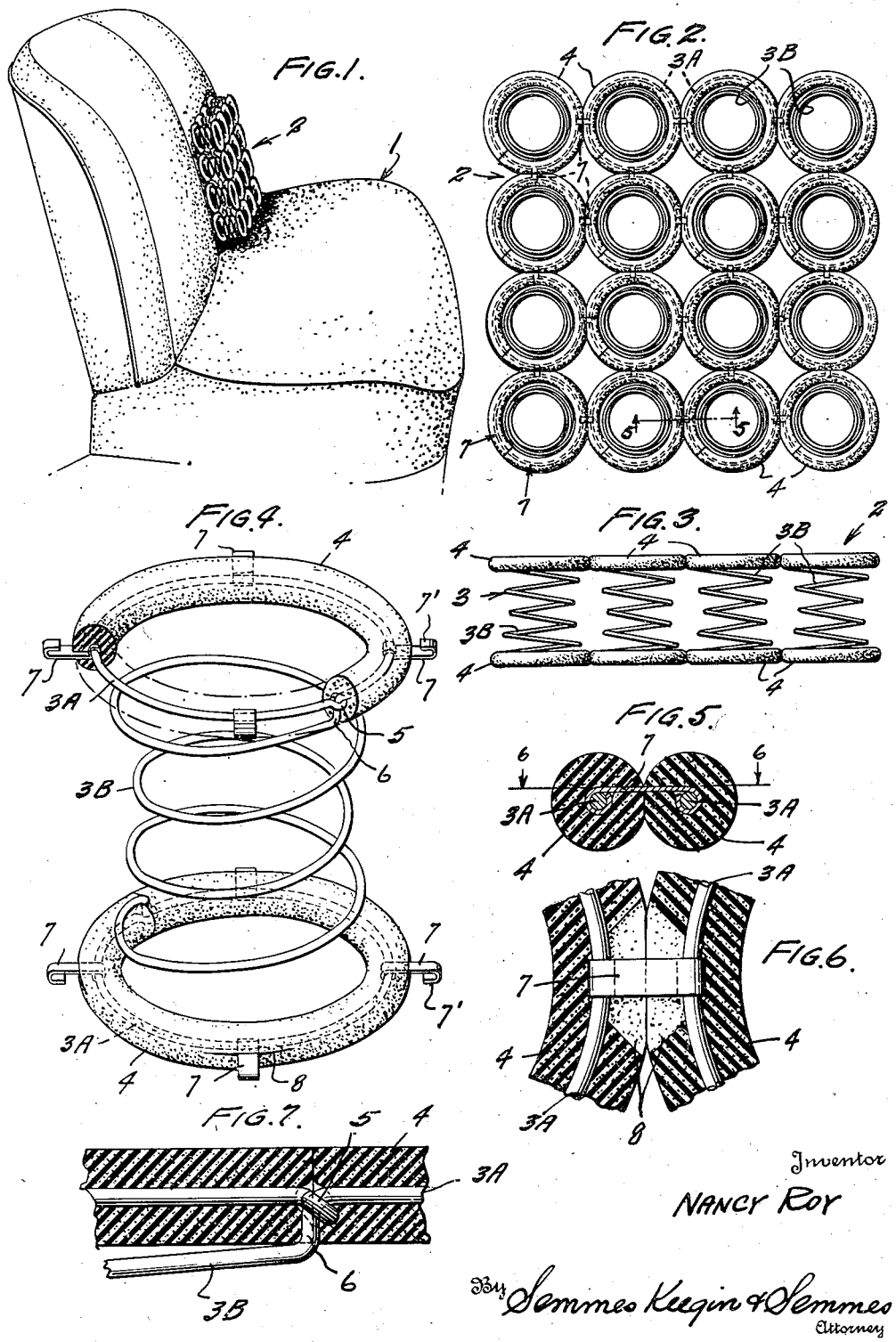

2,276,516

UNITED STATES PATENT OFFICE 2,276,516

CUSHION

Nancy Roy, Miami, Fla.

Application September 26, 1939, Serial No. 296,669

4 Claims. (Cl. 155—179)

This invention relates to cushions, and more particularly relates to an auxiliary automobile cushion, although the inventive concept is by no means limited thereto.

It is well recognized that the cushions furnished as standard equipment on automobiles frequently become uncomfortable after a period of use, and some drivers, particularly if they are short, have difficulty in reaching the various foot pedals. Furthermore, during hot weather, the conventional seats in automobiles are uncomfortable and hot due to the fact that there is no provision for circulation of air in such seats.

An object of my invention is to overcome these defects.

Another object of my invention is to provide a cushion that is cool for the driver and at the same time adds to his comfort in other particulars.

A still further object of my invention is to provide such a cushion that is of simple construction and inexpensive.

To accomplish the above, and other important objects as will more fully appear hereinafter, my invention in general embraces the concept of providing a cushion that permits the free circulation of air therethrough and provides a minimum point of contact with the user, while at the same time is entirely comfortable.

More specifically, my invention contemplates a cushion composed of a plurality of springs which permits the free circulation of air. In the preferred construction, these springs are not covered except insofar as the extreme spiral of each coil may be encased in a suitable material so that the portion of the coil contacting the user will be further cushioned.

In the accompanying drawing there is depicted one specific embodiment of my invention, it being distinctly understood, however, that modifications may be made therein without exceeding the inventive concept.

In the drawing, in which similar numerals refer to the same element:

Figure 1 is a view of a cushion constructed in accordance with my invention used as a cushion for the back of a driver of an automobile.

Figure 2 is a top plan view of the cushion shown in Figure 1.

Figure 3 is a side elevational view of the cushion.

Figure 4 is a detailed view of a single coil.

Figure 5 is a view taken along the line 5—5 of Figure 2, looking in the direction of the arrows.

Figure 6 is a view taken along the line 6—6 of Figure 5, looking in the direction of the arrows.

Figure 7 is a view taken along the line 7—7 of Figure 2, looking in the direction of the arrows.

Referring more specifically to the drawing, 1 designates generally an automobile seat, in association with which my invention, designated generally 2, finds particular application. It will be noted that the cushion serves as a back rest, which may be desirable in view of any deformation of the conventional back of the automobile seat after a period of use, or may be desirable to position the driver nearer the foot pedals. It will be obvious that my cushion finds application for other uses than in an automobile, but it appears to find its maximum utility in this field.

As best shown in Figures 2 and 3, the cushion is composed of a plurality of spiral springs designated generally 3 which are suitably joined to form a unitary structure. The size of the individual springs may, of course, be varied and the number that may be used to compose the complete cushion may likewise be varied. However, if the springs are approximately three and one-half or four inches in diameter, sixteen such springs I find provide a cushion of usually acceptable size.

While the bare springs may be assembled to form the cushion, I find it preferable to sheathe or encase the uppermost and lowermost coil 3A of each spring (Fig. 7). Such a sheath 4 removes the danger of any sharp edge tearing the seat 1 or the clothes of the user, and affords additional resiliency as it serves to cushion the otherwise bare wire. While various materials may be used for the sheath 4, I prefer to use a tube of soft rubber or sponge rubber, which is bored with an axial channel that is substantially the size of the wire used in the spring. This sheath is assembled upon the upper and lower coils in the following manner:

While Figure 7 discloses the manner in which the upper coil may be tied for actual use, the upper and lower coils originally terminate in straight ends. Sheaths of the required length may therefore be slipped over the free end, so that the free end projects slightly beyond the sheath.

The sheath is then compressed longitudinally and the free end is bent around the top coil as indicated by the numeral 5 in Figure 7, and the coil is bent at a right angle to form the short section 6, and thence bent at another right angle to commence the spiral portion 3B of the spring.

Upon relieving the compression on the sheath 4, the sheath will expand so that its free ends will abut, as shown in Figure 7. The ends of the sheath may be cut out to take care of the bent end 5 and the section 6, but with the usual type of sponge rubber this is not necessary. It will be noted that the short section 6 is of a length so that the spiral section 3B starts outside of the sheath 4 and therefore permits a close fit between the abutting ends of the sheath.

It will be noted that the spiral section 3B is of less diameter than the top and bottom coils 3A so that, upon compression of the cushion, there will be no interference between the spiral sections 3B.

Adjoining coils are secured to each other by means of metallic straps 7, which join the upper and lower coils 3B of the springs. Therefore, those springs which are in the center of the assembled cushion are provided with four straps, the intermediate cushions along the outside row are provided with three straps, while the corner cushions require only two straps. The straps 7 are assembled in the following manner:

The sheaths 4 are provided with slits 8 which extend to practically the channel of the sheath. The number of such sheaths depends upon whether it is to be used upon one of the inner or outer coils, but, in any event, the spacing of the slits 8 is such that they will be 90° apart when assembled upon the spiral.

The straps 7, it will be noted from Figure 4, are originally partially bent as at 7', and may therefore be slipped through the slits 8 and over the wire of the top and bottom coils. In this connection, it will be appreciated that the elasticity of sponge rubber is such that this operation may be readily carried out. After the straps 7 have been fitted over the wire of the coil, the bent portion 7' may be further bent to permanently join together the two coils.

It will be seen from the foregoing that my cushion permits of a free circulation of air therethrough, and in contact with the user. The bearing surface between the user and the cushion is maintained at a minimum consonant with the comfort of the user, and the provision of the sheath 4 affords a somewhat greater and more comfortable bearing than would be afforded by the bare coils. The method of joining the several coils to form the complete cushion asures a permanent assembly and at the same time does not interfere with the advantages afforded by the sheathing.

While I decidedly prefer an uncovered cushion, such as shown in the accompanying drawing, under some circumstances it might be desirable to cover the entire top or bottom, or both, of the cushion, but such an arrangement, particularly covering of the top of the cushion, would seriously detract from the advantages of my invention. Likewise, while I have described the invention with specific reference to its use in association with an automobile seat, in which use it finds its greatest application, I desire to point out that this cushion may be used for other purposes.

While I have shown and described the preferred embodiment of my invention, I wish it to be understood that I do not confine myself to the precise details herein set forth by way of illustration, as it is apparent that many changes and variations may be made therein, by those skilled in the art, without departing from the spirit of the invention, or exceeding the scope of the appended claims.

I claim:

1. An auxiliary automobile cushion having a plurality of spiral springs composed of a spiral section and flat coils, the end coils comprising a loop to make the flat coil, the point of juncture of the loop with the spiral section forming an offset member in said spiral section, said end coils being encased in a resilient sheath, and the length of said offset member being equal to the radius of the resilient sheath whereby distortion of the resilient sheath is prevented.

2. An auxiliary automobile cushion comprising a plurality of spiral springs, each spring formed with end coils composed of a loop of wire in the same plane, the point of juncture of the loop of the end coils forming an offset member, said end coils being encased in soft rubber, and the length of said offset member being equal to the radius of the soft rubber encasement.

3. A cushion comprising a plurality of spiral springs disposed adjacent to each other, each spring composed of a spiral section and flat end coils, the end coils comprising a loop to make the flat coil, the point of juncture of the loop with the spiral section forming an offset member in said spiral section, said end coils being encased in a resilient sheath, the length of said offset member being equal to the radius of the resilient sheath whereby distortion of the resilient sheath is prevented and link means connecting the end coils of adjacent spiral springs to provide a unitary structure.

4. A cushion comprising a plurality of spiral springs disposed adjacent to each other, each spiral spring formed with a spiral to each other, each and lower end coils, the end coils comprising a loop to make the flat coil, the point of juncture of the loop with the spiral section forming an offset member in the spiral section, said upper and lower end coils being encased in a resilient sheath, the length of said offset member being equal to the radius of the resilient sheath whereby distortion of the resilient sheath is prevented, a slit extending through said sheath to the end coil, a link adapted to have one end thereof extend through said slit attached to said end coil, and a complimentary slit in the resilient sheath of the adjacent spring, the other end of said link extending through said second mentioned slit and attached to the end coil thereof whereby the adjacent springs are flexibly connected.

NANCY ROY.